Patented Sept. 17, 1946

2,407,701

UNITED STATES PATENT OFFICE 2,407,701

MANUFACTURE OF HALOGENATED HYDROCARBONS

David Gwyn Jones and Maddison Phillipson, Norton-on-Tees, England, assignors to Imperial Chemicals Industries Limited, a corporation of Great Britain No Drawing. Application November 29, 1943, Serial No. 512,256. In Great Britain December 7, 1942

6 Claims. (Cl. 260—656)

This invention relates to improvements in the manufacture of halogenated hydrocarbons, and more particularly to the manufacture of vinyl chloride.

It is known that halogenated hydrocarbons can be obtained by passing a mixture of acetylene and hydrogen halide over a catalyst consisting of porous carbon impregnated with a mercuric compound at an elevated temperature, e. g. 100°–400° C. According to the proportion of acetylene to hydrogen halide either a vinyl halide or an ethylene dihalide or a mixture of the two may result. For a long life of catalyst it is necessary to avoid too high a reaction temperature, since the mercury compound may otherwise be removed from the catalyst by sublimation. Even when precaution is taken to avoid this, loss in activity may occur with continued use due to the poisoning of the catalyst by small amounts of certain sulphur or phosphorus compounds present in the acetylene, e. g. phosphine, hydrogen sulphide or mercaptans.

We have now found that in the production of halogenated hydrocarbons by reacting acetylene containing such impurities with a hydrogen halide at an elevated temperature and in the presence of a catalyst consisting of a mercury compound on a suitable support, e. g. carbon or alumina, the activity of a catalyst which has deteriorated from such a cause can be restored by treating the catalyst at an elevated temperature with chlorine.

According to the present invention, therefore, we provide a process for restoring the activity of a supported mercury catalyst impaired by a catalyst poison of the type normally present as an impurity in acetylene, which comprises treating the catalyst at an elevated temperature with chlorine.

According to a further feature of our invention we provide a process for the production of a halogenated hydrocarbon by passing over a supported mercury catalyst at reaction temperature a gaseous mixture of a hydrogen halide with acetylene containing an impurity normally associated therewith which is a catalyst poison, which process includes the steps of interrupting the passage of the reaction mixture when substantial diminution in the activity of the catalyst has occurred, treating the impaired catalyst at an elevated temperature with chlorine to restore its activity and subsequently renewing the passage of the reaction mixture over the catalyst at reaction temperature.

The treatment of the catalyst to restore its activity is conveniently carried out in the catalyst chamber in which the production of the halogenated hydrocarbon is carried out, and for this purpose the conduits normally used for supplying the reactants and for withdrawing the products may be provided with the necessary valves and T pieces whereby the reactivation of the catalyst can be brought about merely by actuating the valves. In many cases it may be desirable to have two catalyst chambers arranged in parallel so that the catalyst in one is being treated to restore its activity while the other is in use; again, a number of chambers may be arranged in parallel, all but one being used at a given time for the production of the halogenated hydrocarbon while the catalyst in the other is being treated with chlorine to restore its activity.

In order to avoid undesired substitution chlorination of the product made at first when the catalyst is reused, it is preferable to subject the treated catalyst for a short time at an elevated temperature to the action of the hydrogen halide used in the production of the halogenated hydrocarbon to displace adsorbed chlorine. In general, this may be done by recommencing the passage of the hydrogen halide for a short time before re-introducing the acetylene. Usually a treatment for about 1 to 2 hours with hydrogen halide suffices.

Both the reactivation of the catalyst and the treatment with hydrogen chloride may conveniently be carried out at the temperature used for the production of the halogenated hydrocarbon, and if necessary heat may be supplied in order that the temperature may be maintained; such additional heat may be required since the heat produced by the exothermic reaction between the acetylene and the hydrogen halide will not be available during the reactivation step. If desired, the reactivation may be carried out at either a higher or a lower temperature than is used in the production of the halogenated hydrocarbon, e. g. at a temperature as low as 75° C. or as high as 400° C. However, in general, the higher temperatures are not preferred, particularly with a mercuric chloride catalyst, for some of the mercury compound may be volatilised leaving the catalyst correspondingly impoverished.

The preferred mercury catalyst is mercuric chloride supported, for example, on active carbon, alumina, silica gel, or other inert support, but if desired other mercury compounds such as mercuric phosphate or sulphate may be used on such a support.

In one method of carrying out our process as applied to the production of vinyl chloride, a mixture of acetylene and hydrogen chloride in equivalent proportion is passed over an active charcoal mass impregnated with between 1% and 5% of mercuric chloride, and maintained at a temperature of 100° C. to 120° C. Suitably the gas mixture is passed over the catalyst at a space velocity between 100 and 200 hours$^{-1}$, although a greater or lesser space velocity may be employed if desired. (Space velocity is the number of volumes of hot gas passing through unit volume of reaction space in unit time.) The vinyl halide is then recovered from the gas stream leaving the catalyst chamber by condensation.

When the process is started a large fraction, e. g. 90% or more, of the acetylene in the reaction mixture will be converted to vinyl chloride, and this high conversion efficiency may be maintained for a greater or lesser time according to the extent of the impurities in the gas stream introduced with the acetylene. Ultimately, however, the conversion efficiency will fall off to such a value that it becomes uneconomical to continue the process. The supply of reactants is then interrupted and chlorine is passed over the catalyst. During this treatment the catalyst may conveniently be kept at the same temperature as during the production of the vinyl chloride, but this is not essential, for somewhat lower or higher temperatures may be used. After a time, of the order of ½ to 2 hours depending on the nature and quantity of the impurities, the latter will have been removed from the catalyst. The supply of chlorine is then interrupted and the catalyst chamber swept out for a short time with hydrogen chloride alone to remove adsorbed or occluded chlorine.

The production of vinyl chloride can then be again commenced by introducing acetylene into the catalyst chamber with the hydrogen chloride stream.

By this means the activity of the catalyst can be restored to substantially its original high value, and the useful life of the catalyst is thus greatly increased.

The following examples illustrate but do not limit our invention, all parts being parts by weight.

Example 1

A mercuric chloride-on-alumina catalyst was used to produce vinyl chloride from acetylene and hydrogen chloride, and a conversion efficiency of 96% to 98% was obtained. When hydrogen sulphide was passed over the catalyst at 80° C. for a short time the catalyst developed a brown colour, and its conversion efficiency in the above reaction was found to have fallen to 13%. The catalyst was then heated to 100° C. in a stream of chlorine for approximately an hour and then in a stream of hydrogen chloride for a similar time. On using the catalyst again for the production of vinyl chloride from acetylene and hydrogen chloride, the conversion efficiency of the catalyst had increased again to 98%.

Example 2

A mercuric chloride-on-alumina catalyst was used for the production of vinyl chloride from a mixture of hydrogen chloride and acetylene containing a small amount of ethyl mercaptan. The conversion efficiency of the catalyst was initially 97% but in time fell to 54%. On treatment with chlorine and hydrogen chloride as in Example 1 the conversion efficiency of the catalyst was restored to 98%.

Example 3

A mercuric chloride-on-alumina catalyst was used for the production of vinyl chloride from hydrogen chloride and acetylene containing a small amount of phosphine. The initial conversion efficiency of the catalyst of 98% fell in time to 11%. The catalyst was then treated with chlorine and with hydrogen chloride as in Example 1. On using the catalyst again for the production of vinyl chloride its conversion efficiency was found to have risen again to 98%.

We claim:

1. A process for restoring the activity of a supported mercuric chloride catalyst to catalyze the reaction between acetylene and a hydrogen halide for the production of a halogenated hydrocarbon, said catalyst having a diminished activity as a result of continued use in said reaction, which comprises treating the catalyst at an elevated temperature with chlorine and subsequently treating the catalyst at an elevated temperature with a hydrogen halide to remove adsorbed chlorine.

2. A process for restoring the activity of a supported mercuric chloride catalyst to catalyze the reaction between acetylene and a hydrogen halide for the production of a halogenated hydrocarbon, said catalyst having a diminished activity due to poisoning by a compound of an element taken from the group consisting of sulfur and phosphorus as a result of continued use in said reaction, which comprises treating the catalyst at an elevated temperature with chlorine and subsequently treating the catalyst at an elevated temperature with a hydrogen halide to removed adsorbed chlorine.

3. A process for the production of a halogenated hydrocarbon by passing over a supported mercuric chloride catalyst at reaction temperature a gaseous mixture of a hydrogen halide and acetylene, said process being subject to diminished catalyst activity as a result of continued operation, which process includes the steps of interrupting the passage of the reaction mixture when substantial diminution of the activity of the catalyst has occurred, treating the catalyst to restore its activity by passing chlorine over it at an elevated temperature, and subsequently renewing the passage of the reaction mixture over the catalyst at reaction temperature.

4. A process according to claim 3 in which vinyl chloride is produced by passing over the catalyst a gaseous mixture of hydrogen chloride and acetylene.

5. A process for the production of a halogenated hydrocarbon by passing over a supported mercuric chloride catalyst at reaction temperature a gaseous mixture of a hydrogen halide and acetylene said process being subject to diminished catalyst activity as a result of continued operation, which process includes the steps of interrupting the passage of the reaction mixture when substantial diminution of the activity of the catalyst has occurred, treating the catalyst to restore its activity by passing chlorine over it at an elevated temperature and then passing over the treated catalyst at an elevated temperature further quantities of the said hydrogen halide to remove adsorbed chlorine, and subsequently renewing the passage of the reaction mixture over the catalyst at reaction temperature.

6. A process according to claim 5 in which vinyl chloride is produced by passing over the catalyst a gaseous mixture of hydrogen chloride and acetylene.

DAVID GWYN JONES.
MADDISON PHILLIPSON.